(12) United States Patent
Vogt et al.

(10) Patent No.: US 6,194,330 B1
(45) Date of Patent: Feb. 27, 2001

(54) POLYMER LATEX FOR ULTRAVIOLET ABSORBTION ON FABRIC

(75) Inventors: Kirkland W. Vogt, Simpsonville; Shulong Li, Spartanburg, both of SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/127,149

(22) Filed: Jul. 31, 1998

(51) Int. Cl.[7] .................................................. C08L 1/10
(52) U.S. Cl. .............................. 442/133; 524/37; 524/94; 524/145; 524/236; 524/296; 524/379; 524/381; 524/384; 524/398; 524/430
(58) Field of Search .............................. 442/133; 524/37, 524/94, 145, 236, 296, 297, 379, 381, 384, 398, 432

(56) References Cited

U.S. PATENT DOCUMENTS

| | | |
|---|---|---|
| 3,377,249 | 4/1968 | Marco .................................. 8/115.6 |
| 3,429,852 | 2/1969 | Skoultchi .............................. 260/47 |
| 3,540,835 | 11/1970 | Marco .................................. 8/115.6 |
| 3,563,795 | 2/1971 | Williams et al. .................. 117/139.4 |
| 3,574,620 | 4/1971 | Tesoro ................................. 117/62.1 |
| 3,598,641 | 8/1971 | Miller et al. .................. 117/138.8 E |
| 3,620,826 | 11/1971 | Machell ........................ 117/139.5 C |
| 3,625,754 | 12/1971 | Dunn ............................ 117/138.8 F |
| 3,632,420 | 1/1972 | Kuhn ............................. 117/138.8 F |
| 3,649,165 | 3/1972 | Cotton ................................ 8/115.5 |
| 3,650,801 | 3/1972 | Hinton, Jr. et al. ............... 117/47 A |
| 3,652,212 | 3/1972 | Machell ................................ 8/115.5 |
| 3,660,010 | 5/1972 | Georgoudis et al. ................. 8/115.6 |
| 3,676,052 | 7/1972 | Harper et al. ....................... 8/115.6 |
| 3,690,942 | 9/1972 | Vandemaas et al. ........... 117/138.8 F |
| 3,745,010 | 7/1973 | Janssens et al. ..................... 96/84 R |
| 3,761,272 | 9/1973 | Mannens et al. .................... 96/84 R |
| 3,897,206 | 7/1975 | Kearney ................................. 8/120 |
| 3,953,643 | * 4/1976 | Cheung et al. ....................... 428/520 |
| 3,981,807 | 9/1976 | Raynolds .............................. 252/8.8 |
| 4,014,857 | 3/1977 | Schmoyer ....................... 260/67.6 R |
| 4,068,035 | 1/1978 | Violland et al. ..................... 428/279 |
| 4,073,993 | 2/1978 | Lark ..................................... 428/261 |
| 4,090,844 | 5/1978 | Rowland ................................. 8/120 |
| 4,131,550 | 12/1978 | Marco .................................. 252/8.6 |
| 4,164,392 | 8/1979 | Hauser et al. .......................... 8/18 R |
| 4,168,954 | 9/1979 | Marco .................................... 8/18 R |
| 4,207,071 | 6/1980 | Lipowitz et al. .................... 8/115.6 |
| 4,290,765 | 9/1981 | Sandler ................................ 8/115.6 |
| 4,427,557 | 1/1984 | Stockburger ......................... 252/8.7 |
| 4,443,534 | 4/1984 | Kojima et al. ....................... 430/512 |
| 4,455,368 | 6/1984 | Kojima et al. ....................... 430/507 |
| 4,528,311 | 7/1985 | Beard et al. ........................... 524/91 |
| 4,612,358 | 9/1986 | Besecke et al. ..................... 526/259 |
| 4,652,656 | 3/1987 | Besecker et al. .................... 548/261 |
| 4,716,234 | 12/1987 | Dunks et al. ........................ 548/259 |
| 4,845,180 | 7/1989 | Henry et al. ........................... 528/73 |
| 4,863,802 | 9/1989 | Moore et al. ........................ 428/412 |
| 4,892,915 | 1/1990 | Slongo et al. ....................... 526/259 |
| 4,937,277 | 6/1990 | O'Lenick, Jr. ...................... 524/318 |
| 5,032,498 | 7/1991 | Rody et al. .......................... 430/512 |
| 5,063,048 | 11/1991 | Saitoh et al. ........................... 424/59 |
| 5,099,027 | 3/1992 | Vogl et al. ............................ 548/259 |
| 5,143,729 | 9/1992 | Thompson ........................... 424/402 |
| 5,191,045 | 3/1993 | Funaki et al. ........................ 526/259 |
| 5,458,924 | 10/1995 | Kashiwai et al. ................. 427/389.9 |
| 5,459,222 | 10/1995 | Rodgers et al. ....................... 528/73 |
| 5,516,436 | 5/1996 | Uchida et al. ........................ 252/8.6 |
| 5,521,266 | 5/1996 | Lau ...................................... 526/200 |
| 5,627,227 | 5/1997 | Suga et al. ............................. 524/91 |
| 5,629,365 | 5/1997 | Razavi .................................. 524/37 |

FOREIGN PATENT DOCUMENTS

WO94/00524    1/1994   (WO) .

OTHER PUBLICATIONS

Gupta, A., et al., "Photooxidative Degradation of Clear Ultraviolet Absorbin Acrylic Copolymer Surfaces, " *Physiochem. Aspects Polym. Surf.*, pp. 293–303 (Proc. Int. Symp.) (1983).

Liu, R., et al., "Functioal polymers, LIII. Photochemical behavior of 2(2–hydroxyphenyl)2H–benzotriazole derivatives. 1. Ultraviolet spectra and efficiency of photostabilization of 2(2–hydroxy–4–acryloxyphenyl)2H–benzotriazole, its polymers and copolymers," *Polymer Bulletin20*, pp. 29–66 (Springer–Verlag) (1988).

Borsig, E., et al, "Reactivity Ratios and UV Spectral Characteristics of Copolymers of Vinyl or Isopropenyl Derivatives of 2(2–hydroxyphenyl)–2H–benzotriazoles," *Collect. Czech. Chem. Commun.*, vol. 54, pp. 996–1004 (1989).

The Engineering Society for Advancing Mobility Land Sea Air and Space, Society of Automotive Engineers (SAE) Surface Vehicle Recommended Practice Test Method SAE J–1885, Accelerated Exposure of Automotive Interior Trim Compnents Using a Controlled Irradiance Water cooled Xenon–Arc Apparatus (Society of Automotive Engineers, Inc.) (1992).

Riedel, J., et al. "Multifunctional Polmeric UV Absorbers for Photostabilization of Wool," *Textile Res. J. 66*, pp. 684–689 (1996).

Cyasorb®, UV 416 Light Stabilizer, Preliminary Data (Cyanamid) (date unknown).

AATCC Test Method 183–1998, Transmittance or Blocking of Erythemally Weighted Ultraviolet Radiation Through Fabrics.

* cited by examiner

*Primary Examiner*—Elizabeth M. Cole
(74) *Attorney, Agent, or Firm*—Terry T. Moyer; William S. Parks

(57) ABSTRACT

A process for the production of an ultra violet absorbing polymer latex is provided. The inventive process involves the emulsion polymerization of a benzotriazole- or benzophenone-containing monomer with a vinyl functional monomer in the presence of a chain transfer agent, preferably 1-dodecanethiol. The latex provides excellent long-lasting, easy to apply, difficult to remove, ultraviolet absorption properties for many different substrates, most notably fabrics. Different articles and fabrics coated, covered, laminated, and the like, with the inventive latex are also provided.

20 Claims, No Drawings

POLYMER LATEX FOR ULTRAVIOLET ABSORBTION ON FABRIC

FIELD OF THE INVENTION

This invention relates to a polymer latex which provides excellent long-lasting ultraviolet absorption and colorlightfastness when applied to myriad substrates, notably plastics and fabrics. The inventive latex comprises benzotriazole or benzophenone monomers copolymerized with acrylic acid comonomers, all of which are subjected to a chain transfer agent during emulsion polymerization. The resultant latex obtains excellent long-lasting ultraviolet absorption characteristics and is easy to apply to and difficult to remove from fabrics, thus providing a cost-effective improvement over the prior art. Moreover, the invention covers fabrics treated with the inventive polymer latex, particularly those fabrics which have undergone supersonic air post-treatment. The resultant articles to which the inventive latex is applied are also contemplated within this invention.

BACKGROUND OF THE PRIOR ART

The risks posed by ultraviolet radiation have become noteworthy in recent years as concerns over environmental issues, particularly the thinning of the earth's protective ozone layer, increase. For instance, incidences of skin cancer due to overexposure to solar radiation and thus harmful ultraviolet rays have been on the rise. Ultraviolet (UV) radiation which has proven harmful to human skin includes the two different types known as UV-A, which falls within the range of 320–400 nm along the light spectrum, and UV-B, which is between 290–320 nm in wavelength. Any manner of reducing or preventing transmission of UV light thus must effectively block or absorb such radiation between these wavelengths (290 and 400 nm).

Ultraviolet radiation also affects the color of certain substrates by initiating degradation of dyes, colorants, pigments, and the like. Long-term exposure to direct sunlight eventually results in a loss of color or, at the least, a noticeable decrease in color strength. Such effects are particularly problematic within the automotive upholstery and drapery industries since the colored surfaces, car seats and curtains, are potentially exposed to ultra violet radiation for a great deal of time.

Sun protective compositions for direct contact with skin and colored surfaces have been developed in order to better prevent the damaging results from such overexposure. For instance, PABA, or para-aminobenzoic acid, is a popular UV blocking (or absorbing) compound which may be incorporated into a composition, such as a tanning lotion for skin, or a coating composition for car seats, and the like. This compound effectively absorbs the harmful radiation within the ultraviolet range of frequencies such that the user's skin or subject substrate is not fully exposed to such light. Recently, a new ultraviolet protective factor (UPF) test has been developed and adopted by the American Association of Textile Colorists and Chemists (AATCC) which provides a more thorough measurement of the ultraviolet absorption capabilities of specific fabrics within both the UV-A and UV-B wavelength ranges. This method, AATCC Test Method 183-1998 determines the ultraviolet radiation blocked or transmitted by textile fabrics intended to be used for UV protection. By utilizing a spectrophotometer or spectroradiometer, the UPF is calculated as the ratio of the erythemally (with erythema being the measurement of abnormal redness of skin due to ultraviolet radiation exposure) weighted ultraviolet radiation (UV-R) irradiance at the detector with no specimen present as compared to the UV-R irradiance with a specimen present, both over a range of wavelengths measured in intervals. This AATCC Test Method also measures Solar Spectral Irradiance through the subject fabric.

In order to decrease ultraviolet transmissions through clothing, past developments have provided protective measures from such harmful radiation through the introduction of certain compounds into or onto apparel fabrics. The prior art representative of this technology includes U.S. Pat. Nos. 4,857,305 to Bernhardt et al., 5,458,924 to Kashiwai et al., and 5,637,348 to Thompson et al, as well as United Kingdom Patent 889292 to American Cyanamid. Furthennore, certain types of weaves, twists, or bends of yarns or fabrics have been developed which effectively screen a wearer's skin from ultraviolet radiation. Such technology is represented within the prior art through U.S. Pat. No. 4,861,651 to Goldenhersh. With such chemically treated or physically modified fabrics, a wearer could then cover his or her skin more effectively solely through adorning themselves with such sun protective apparel. However, the prior art modified fabrics still permit transmission of relatively high levels of UV transmission and are expensive to produce. In order to decrease the potential color degradation for substrates due to ultra violet exposure, UV-absorbing copolymer latices have been utilized, most notably as films, coatings or adhesives. Such latices have provided, for example, a barrier to potentially damaging ultraviolet rays, both to a coated article and to, if such an article comprises apparel, a wearer of such an article. Polymer UV absorbing latices for textiles thus generally provide a beneficial, cost-effective protective alternative to higher density and higher costing fabrics.

Ultraviolet absorbing polymer latices incorporating UV-absorbing monomers and vinyl-functional comonomers have been disclosed within the prior art. However, nowhere has the novel procedure of emulsion polymerization of at least two monomers, all in the presence of a chain transfer agent, most notably 1-dodecanethiol, been taught, fairly suggested, or practiced. Past polymer UV absorbing latices include those taught within U.S. Pat. No. 5,629,365, to Razavi, entirely incorporated herein by reference. Such polymer latices comprise the same comonomers as in the instant, namely benzotriazole- and/or benzophenone-containing monomers polymerized with vinyl functional monomers; however, patentee both requires that the final product be subject to cross-linking, as is unnecessary within the inventive latex, and fails to mention or fairly suggest the presence of a chain transfer agent. Also of note as prior UV-absorbing polymer latices are those products taught within U.S. Pat. No. 4,528,111, to Beard et al., also herein entirely incorporated by reference. These polymers comprise the same benzotriazole comonomers as in the present invention; however, such latices are not formed of the same vinyl-functional comonomers, or through the same emulsion polymerization in the presence of a chain transfer agent as within the inventive latex. Patentee's latices are made through a solution polymerization process which includes the utilization of environmentally damaging solvents. Furthermore, the requisite solvents used within solution polymerization procedures are known to adversely affect subject substrates, particularly textiles, through dissolving dyes and colorants, hindering lightfastness by plasticizing finishes on textiles, and degrading polymer coatings. As a result, solution polymerization is an highly undesirable method of producing a stable polymer latex, again, particularly for textile substrates.

Other prior U.S. patents disclose similar compositions and procedures as those mentioned above; however, again, there is no prior teaching of the inventive process utilizing a chain transfer agent during an emulsion polymerization in order to form an UV-absorbing polymer latex. Such U.S. Patents which teach the polymerization of an UV-absorbing monomer with a vinyl functional comonomer include 3,429,852, to Skoultchi, 3,745,010, to Janssens et al., 3,761,272, to Mannens et al., 4,443,534, to Kojima et al., 4,455,368, to Kojima et al., 4,612,358, to Besecke et al., 4,652,656, to Besecke et al., 5,099,027, to Vogl et al., and 5,459,222, to Rodgers et al., all herein entirely incorporated by reference.

Even with all the previous work performed in this crowded area, there still remains a great need to produce a long-lasting, lightfast, stable, hard to remove, easily handled, and cost-effective ultra violet-absorbing polymer latex for application to certain surfaces in order to act as a barrier against potentially damaging penetrative UV rays.

DESCRIPTION OF THE INVENTION

It is therefore an object of this invention to provide a UV-absorbing polymer latex which produces optimum colorlightfastness performance on different substrates and effectively prevents color degradation through UV exposure to different substrates, including fabrics and polymeric films and composites. Also, it is an object of this invention to provide optimum UV-absorption performance for the inventive polymer latex through the manipulation of the specific latex monomer/comonomer ratios. Furthermore, an object of the invention is to provide the most reliable, best performing, easily adhering, and semi-permanent UV-absorbing polymer latex through the utilization of emulsion polymerization, and more particularly semi-batch emulsion polymerization, in the presence of a chain transfer agent. Additionally, it is an object of the invention to improve the overall performance of the inventive polymer latex by adjusting the post-polymerization surface tension of the latex to an optimum level on the subject substrate. Yet another object of the invention is to provide an improved UV-absorbing coating for fabrics, with improved UV-absorption and colorlightfastness, in comparison to those taught within the prior art which comprise the same type and amount of UV-absorbing monomer and vinyl-functional comonomer. Still a further object of the invention is to provide improved colorlightfastness and UV absorption for a pile fabric substrate by coating the substrate with the inventive latex and subsequently exposing the coated substrate to a supersonic air post-treatment.

Accordingly, this invention concerns a method of making an ultra violet absorbing copolymer latex by emulsion polymerization comprising mixing together, in the presence of at least one polymerization initiator and at least one chain transfer agent, (a) at least one monomer having at least one ultra violet absorbing functionality selected from the group consisting essentially of benzotriazole, benzophenone, and mixtures thereof; and (b) at least one monomer having at least one vinyl functionality.

Also, the invention concerns articles made therefrom and such articles pretreated with supersonic air applications.

Nowhere within the prior art has such a specific method of producing an UV-absorbing polymer latex utilizing both emulsion polymerization and a chain transfer agent been disclosed, practiced, or fairly suggested. Such a method provides a significant advantage over the solution polymerized and merely cross-linked (and not subjected to any chain transfer agent) latices of the prior art. Through the utilization of an emulsion polymerization process in conjunction with the presence of a chain transfer agent, it has been determined that the inventive polymer latex offers several novel and highly unexpected benefits. First, and most notably, the inventive latex effectively absorbs UV radiation and provides optimal colorlightfastness with a low amount of UV-absorbing monomer and a high amount of acrylate comonomer, particularly when applied to fabrics. Generally, one of ordinary skill in this art would expect that increased weight ratios of UV-absorbing monomer would improve UV-absorption and colorlightfastness. Surprisingly, such a belief is not the case here.

Second, the production of the best performing UV-absorbing polymer latex has been found to involve a manufacturing process utilizing a chain transfer agent (and not a cross-linking agent) during emulsion polymerization. Again, such a combination with the particular monomers and comonomers of the inventive latex produces the unexpected improvements in UV-absorbing properties and colorlightfastness, especially for fabric substrates. Chain transfer agents are unlikely candidates as additives within the particular polymerization processes simply because one of ordinary skill in the art would expect longer chain polymers to provide better lightfastness and UV-absorbing capabilities and chain transfer agents actually lower the degree of polymerization. Furthermore, such chain transfer agents are not normally used in emulsion polymerizations.

Third, it has been found that colorlightfastness characteristics can be optimized after polymerization upon producing the optimal surface tension of the latex. The ability of a latex to coat a substrate is highly dependent on the relative surface tension values of both the latex and the subject substrate. In order to thoroughly coat the desired substrate, then, it is necessary to modify the surface tension of the polymer latex to closely equal the surface tension of the subject substrate. The inventive polymer latex will generally obtain a much higher surface tension than that of the fabric or polymer film, as merely examples, on which the latex to be coated. The surface tension of the inventive polymer latex may thus be modified through the addition of wetting agents/surfactants in order to facilitate the desired coating process. Water-soluble wetting agents are one class of surfactants which may be employed in this respect, including lower aliphatic alcohols nonionic surfactants. The most preferred surfactants are those which are fluorinated, such as Zonyl™, available from DuPont, and Fluorad®, available from 3M. Some more examples of suitable surfactants as well as a further discussion of this aspect of the inventive method are presented in U.S. Pat. No. 5,629,365, to Razavi, as entirely incorporated herein by reference above.

Fourth, it has been found that the UV-absorbing monomer, when polymerized with the acrylate comonomer, and subsequently coated onto a substrate surface, provides improved UV-absorption and colorlightfastness when compared to coatings of conventional UV monomeric absorbers utilized alone and at equivalent UV-absorbing group concentration (i.e., the same amount of UV-absorber of prior art coatings as the amount of UV-absorbing monomer present in the inventive polymer latex). Such a result is very surprising and unexpected, considering the relative inexpensive cost of acrylate comonomers as compared to the cost for UV-absorbing monomers and/or compounds.

Last, it has been found that supersonic air post-treatment special processing of pile fabrics coated with the inventive UV-absorbing polymer latex improves colorlightfastness performance. Such supersonic air treatments include those disclosed in U.S. Pat. No. 4,837,902, U.S. patent applications Ser. Nos. 08/593,670 and 08/999,638, and PCT Application PCT/US97/16,415, all to Dischler. Such treatments allow the individual pile fibers to "stand up" and/or open up improving colorlightfastness. The prior art teachings do not permit such extensive and beneficial characteristics.

The resultant inventive polymer latex comprises at least one UV-absorbing monomer and at least one vinyl functional comonomer. Generally, any proportions of these two constituents will provide effective ultra violet protection and colorlightfastness. However, it has been found that, surprisingly, ratios of amounts of the two monomers from about 10% UV absorbing monomer/90% vinyl functional comonomer to about 85%/15%, provide optimum results with regard to the aforementioned desired properties. From a colorlightfastness/cost effectiveness perspective, a more preferred range of ratios encompasses from about 50%/50% to about 25%/75%. Most preferred, again from a position that the UV monomers are very expensive and colorlightfastness of the latex on the fabric substrate is highly desired, is a range from about 40%/60% to about 35%/65% UV monomer to vinyl-functional monomer. Improved ultra violet protection seemingly would be afforded with a greater amount of such a UV-absorbing monomer within the final polymer latex product; however, upon control of the final molecular weight distribution through the utilization of a chain transfer agent in a batch emulsion polymerization process allows for lower amounts of expensive UV-absorbing monomer to be used in order to obtain the most beneficial characteristics. As discussed further below, a batch procedure (which entails the complete addition of all components simultaneously) provides unexpectedly favorable UV absorbing and lightfast characteristics as compared to a polymer latex formed through a semi-batch process (periodic additions of components over time). Even so, the inventive latex may be formed in any manner, with a batch procedure the preferred specific method.

The inventive polymer latex also required a certain solids content to permit optimum results. In particular, a rather low level of solids is desired. For instance, the entire polymer latex should have an average solids content (per individual polymer) of from about 15 to about 55%, preferably from about 20 to about 45%, and most preferably from about 25 to about 33%. These levels provide beneficial convenience in handling and resultant properties as well as better overall stability within the final polymer product.

Any benzotriazole- or benzophenone-containing vinyl-functional monomer may be utilized within the inventive polymer latex and method of making such a latex as what is described as the UV-absorbing comonomer. Such monomers are well known as providing effective UV-absorption for myriad surfaces, particularly on fabric substrates. The preferred UV-absorbing monomer is 2-Hydroxy-5-acrylyloxyphenyl-2H-benzotriazole (sold by Janssen Pharmaceuticals under the tradename Norbloc 7966). Other particularly usefull specific UV-absorbing monomers within this invention include 1-(3-benzotriazol-2-yl-4-hydroxyphenyl)-ethyl ester acrylic acid (manufactured by Hoechst Celanese), 2-(2-methacryloxy-5'-methylphenyl) benzotriazole (manufactured by Polysciences, Inc.), and 2-hydroxy-4-acrylyloxyethoxy benzophenone (sold under the tradename Cyasorb™ UV-416 by Cytec, Inc.).

The vinyl-functional comonomer encompasses any non-UV functional group (benzotriazole, benzophenone, and the like) containing monomer having a vinyl functionality. Any such monomer can be employed within this inventive polymer latex; however, particularly preferred are those based on acrylic acids, including acrylates and methacrylates, and most particularly the following: butyl methacrylate, butyl acrylate, methyl methacrylate, butyl methacrylate, ethylhexyl methacrylate, lauryl methacrylate, isodecyl methacrylate, methacrylic acid, and n-hexyl methacrylate. Most preferred is butyl methacrylate, particularly in combination with 2-Hydroxy-5-acrylyloxyphenyl-2H-benzotriazole. The use of any of these or mixtures of these comonomers is dependent upon the desired stability and/or handling properties for the entire inventive polymer latex.

The term chain transfer agent means a compound which functions both as a polymerization inhibitor and initiator. Basically, after polymerization begins, such a process continues either until the supply of available monomer is depleted or until some type of inhibitor acts upon the polymerized compound. A chain transfer agent reacts with a polymerized compound by capping the reactive portion of the reactant (i.e., comprises a free radical or an ionically charged moiety) thereby effectively inhibiting polymerization of that one particular compound. However, such a chain transfer agent also has the ability to start polymerization in a previously unreacted monomer by displacing an electron or a leaving group. Such an agent is unique to addition polymerization processes, especially within such processes utilizing batch techniques. Any chain transfer agent may be utilized within the inventive method; however, preferred is 1-dodecanethiol. Other chain transfer agents workable within this invention include, without limitation, thiophenol, hydrophobic polymercaptans, and hydrophobic halogenated compounds. The chain transfer agent (CTA) should be present in amounts of grams CTA per grams aggregate UV monomer and vinyl-functional monomer of from about 0.002 to about 0.050%; preferably from about 0.008 to about 0.018%; and most preferably at about 0.0175%.

The polymerization initiator may be any of the well known compounds which perform such a function. For instance, peroxide, persulfate, and ultra violet light are only a few of the many potential compounds and manners of catalyzing the polymerization process within the inventive method. Preferred are coupled persulfate/bisulfites and azo (peroxides).

The textile fabric utilized within the inventive process may comprise any synthetic or natural fiber or blend of such fibers. As merely examples, and not intended as limitations, the textile fabric may be constructed from fibers of polyester, nylon (−6 or −6,6), cotton, polyester/cotton blends, wool, ramie, lycra, and the like. The preferred substrate is made of polyester, and most preferably polyethylene terephthalate yams. Also, the textile fabric may be of woven, non-woven, or knit construction. Knit is the most preferred.

The application of the latex to a substrate may be accomplished through in situ formation of the inventive latex on the substrate surface or through any well known coating or impregnation procedure. Included, without any limitation intended, within this step are exhausting from a liquid formulation onto a fabric substrate, dipping/padding, knife coating, spraying, roll coating, foam coating, and the like. Particularly preferred is an exhaustion procedure from a liquid to a fabric substrate within a dye jet process.

To the subject substrate, any number of additives may be added either pre- or post-application of the inventive latex. For instance, when a fabric substrate is utilized, any standard textile additives, such as dyes, colorants, pigments, softening agents, antioxidants, flame retardants, rheology agents, soil redeposition agents, and the like, may be applied to the fabric surface. Cross-linking agents are not desired within the inventive latex. Cross-linking, which is a totally different process from chain transfer, would result in an uneven molecular weight distribution within the inventive latex such that the desired colorlightfastness characteristics, as well as ease of handling and application, would not be attainable. Particularly desired as optional finishes to the inventive fabrics are soil release agents which improve the wettability and washability of the fabric. Preferred soil release agents include those which provide hydrophilicity to the surface of polyester. With such a modified surface, again, the fabric imparts improved comfort to a wearer by wicking moisture. The preferred soil release agents contemplated within this invention may be found in U.S. Pat. Nos. 3,377,249; 3,540,835; 3,563,795; 3,574,620; 3,598,641; 3,620,826; 3,632,420; 3,649,165; 3,650,801; 3,652,212; 3,660,010; 3,676,052; 3,690,942; 3,897,206; 3,981,807; 3,625,754; 4,014,857; 4,073,993; 4,090,844; 4,131,550; 4,164,392; 4,168,954; 4,207,071; 4,290,765; 4,068,035; 4,427,557; and 4,937,277. These patents are accordingly incorporated herein by reference.

The inventive composite may be utilized for any substrate which functions as a covering, particularly from sunlight, or which has a surface which is colored and subject to ultra violet radiation degradation. As merely examples, then, the inventive latex may be applied to apparel, automotive upholstery, furniture upholstery, drapery, napery, tents, awnings, plastic bottles and/or containers made from polypropylene, polyethylene, polyurethane, polyethylene terephthalate, and mixtures thereof, and the like.

DETAILED DESCRIPTION OF THE PREFERRED EMBODIMENT

The preferred embodiment of the inventive method and composition is set forth in the following EXAMPLES.
Production of the Inventive Latex

EXAMPLE 1

A dispersion of Norbloc™ 7966 (available from Janssen) was first prepared with a sandmill in order to obtain an average particle size of below 1 micron. 5 g. of Synfac® 8216 (available from Milliken Chemical), 4 g. of Synfac® 8337 (available from Milliken Chemical), 6 g. Abex™ 18S (available from Rhône Poulenc), 0.5 g. Surfynol® TGE (available from Air Products), and 300 g. deionized water were admixed in a beaker until the surfactants all were dissolved. 120 g. of Norbloc™ 7966 were then stirred into the solution and the entire solution was then poured into a stirred, glass-lined sandmill. 550 g. of sand were then slowly added to the sandmill and milled for 1 hour. The resultant dispersion was then removed and measured to constitute about 28% in solids. 85.7 g. of the dispersion were then added to a 125 ml. Erlenmeyer flask and diluted to 100 g. with distilled water. In a second flask, 0.6 g Rhodacal® DS-10 (available from Rhône Poulenc), 0.2 g Pluronic® F68 (available from BASF), 0.6 g. of polyvinyl pyrrolidone K-90 (available from ISP Technologies), and 0.2 g 1-dodecanethiol (available from Aldrich) were dissolved in 50 g. distilled water. After dissolution, 36 g. of butyl methacrylate and 0.3 g methacrylic acid (both available from Rohm & Haas) were added and the second flask solution was stirred until a stable emulsion was formed. This emulsion was then dilute further to 100 g. with distilled water. In a third flask, 0.6 g Rhodacal® DS-10 and 0.3 g Pluronic® F68 were dissolved in 100 g. distilled water. In separate vials, a catalyst solution comprising 0.04 g. sodium bisulfite (available from Aldrich) and an initiator solution of 0.04 g. ammonium persulfate (available from Aldrich) were dissolved in 6 g. distilled water each.

The contents of the third flask were poured into a 1L reactor equipped with a nitrogen inlet, thermometer, stirrer, and condenser with nitrogen outlet. The reactor was heated to about 70° C., while being nitrogen purged, for 30 minutes. A 1 ml. sample of the catalyst solution and a 1 ml. sample of the initiator solution were each added to flasks 1 and 2, respectively, while stirring. 0.5 ml samples of each of the catalyst and initiator solutions were also each added to the reactor. The contents of flasks 1 and 2 were then pumped into the reactor at a rate of 0.5 ml/min. After 175 minutes, the addition of monomers was stopped and additional 0.2 ml samples of both the catalyst and initiator solutions were each added to the reactor. The temperature of the reactor was kept at 70° C. for 1 hour and then the reactor was allowed to cool. This semi-batch emulsion polymerization procedure yielded a 40 wt. % Norbloc 7966/60wt. % butyl methacrylate UV-absorbing polymer emulsion with 25–30% solids.

EXAMPLE 2

The UV-absorbing polymer emulsion from EXAMPLE 1 was diluted to obtain a latex comprising 2% solids (latex A). A drop of latex A was applied to a polyester film to test its wettability and it was found that latex A would not wet the surface. The surface tension of latex A was then decreased by dispersing 0.12% DuPont Zonyl™ FSN into the latex in order to form a second latex sample, latex B. This dispersion was tested for its wettability and was found to indeed wet the surface of the subject polyester film indicating that the surface tension of latex B was less than or equal that of the polyester film (about 37–39 dynes/cm).

Application of the Inventive Latex to Various Substrates

EXAMPLE 3

The polymer latex of EXAMPLE 1 was then applied to fabric during a dye jet procedure. The latex was present in an amount of about 4% owf (roughly about 0.8% solids content owf) in the dye liquor. The remaining dye liquor components were as follows:

| DYE LIQUOR COMPOSITION | |
|---|---|
| Component | Amount (owf) |
| Millex ® defoamer 950 | 0.80% |
| Synfac ® 9214 (surfactant) | 0.08% |
| Millitex ® DA-45 | 1.50% |
| Millitex ® DA-50 | 1.50% |
| Leveler 550 | 0.50% |
| Acetic Acid (84%) | 0.45% |
| Hostalux ™ EBU | 1.00% |

The fabric was a white-colored 100% polyester microdenier knit. The ratio of fabric to liquor was about 1:10. The dye liquor and fabric were added to the dye jet machine and subsequently heated. The machine was heated on a rising scale initially at a temperature of about 68° F. which was gradually raised 4° F. per minute until it reached 160° F.; then raised 3.5° F. per minute until it reached 240° F.; then 3° F. per minute until it reached 280° F. The machine was kept heated at a temperature of about 280° F. and then the temperature was lowered 3° F. per minute until it reached 140° F. The ultraviolet absorption was measured for a sample coated with the inventive polymer latex as well as a control of uncoated fabric. UV absorption measurements were taken for each wavelength from 300 to 400 nm which are listed in the following table:

TABLE 1

| Fabric Coated With Inventive Latex | | Uncoated Fabric Sample | |
|---|---|---|---|
| Wavelength (nm) | Absorbance | Wavelength (nm) | Absorbance |
| 300 | 1.8094 | 300 | 0.6326 |
| 301 | 1.8383 | 301 | 0.5792 |
| 302 | 1.8253 | 302 | 0.5495 |
| 303 | 1.7990 | 303 | 0.5062 |
| 304 | 1.8127 | 304 | 0.4646 |
| 305 | 1.8350 | 305 | 0.4238 |
| 306 | 1.7826 | 306 | 0.873 |
| 307 | 1.8077 | 307 | 0.3453 |
| 308 | 1.7943 | 308 | 0.3214 |
| 309 | 1.7921 | 309 | 0.2885 |
| 310 | 1.8306 | 310 | 0.2675 |
| 311 | 1.7964 | 311 | 0.2505 |
| 312 | 1.7619 | 312 | 0.2395 |
| 313 | 1.7981 | 313 | 0.2258 |
| 314 | 1.7669 | 314 | 0.2162 |
| 315 | 1.8006 | 315 | 0.2061 |
| 316 | 1.8177 | 316 | 0.2014 |
| 317 | 1.8032 | 317 | 0.1901 |
| 318 | 1.8311 | 318 | 0.1901 |
| 319 | 1.8494 | 319 | 0.1880 |
| 320 | 1.8396 | 320 | 0.1850 |
| 321 | 1.8803 | 321 | 0.1849 |
| 322 | 1.8396 | 322 | 0.1769 |
| 323 | 1.8802 | 323 | 0.1752 |
| 324 | 1.8698 | 324 | 0.1761 |
| 325 | 1.9143 | 325 | 0.1762 |
| 326 | 1.9399 | 326 | 0.1759 |
| 327 | 1.9243 | 327 | 0.1763 |
| 328 | 1.9465 | 328 | 0.1718 |
| 329 | 1.9402 | 329 | 0.1653 |
| 330 | 1.9597 | 330 | 0.1673 |
| 331 | 1.9699 | 331 | 0.1658 |
| 332 | 1.9709 | 332 | 0.1676 |
| 333 | 1.9779 | 333 | 0.1616 |
| 334 | 1.9789 | 334 | 0.1597 |
| 335 | 2.0044 | 335 | 0.1592 |
| 336 | 1.9877 | 336 | 0.1554 |
| 337 | 1.9968 | 337 | 0.1577 |
| 338 | 2.0020 | 338 | 0.1571 |
| 339 | 1.9725 | 339 | 0.1533 |
| 340 | 1.9881 | 340 | 0.1536 |
| 341 | 2.0247 | 341 | 0.1529 |
| 342 | 1.9883 | 342 | 0.1530 |
| 343 | 1.9937 | 343 | 0.1495 |
| 344 | 1.9928 | 344 | 0.1510 |
| 345 | 1.9746 | 345 | 0.1456 |
| 346 | 1.9909 | 346 | 0.1474 |
| 347 | 1.9807 | 347 | 0.1480 |
| 348 | 1.9709 | 348 | 0.1425 |
| 349 | 1.9863 | 349 | 0.1440 |
| 350 | 1.9728 | 350 | 0.1420 |
| 351 | 1.9439 | 351 | 0.1395 |
| 352 | 1.9671 | 352 | 0.1382 |
| 353 | 1.9662 | 353 | 0.1360 |
| 354 | 1.9451 | 354 | 0.1378 |
| 355 | 1.9322 | 355 | 0.1343 |
| 356 | 1.9191 | 356 | 0.1321 |
| 357 | 1.9260 | 357 | 0.1329 |
| 358 | 1.9074 | 358 | 0.1289 |
| 359 | 1.9035 | 359 | 0.1270 |
| 360 | 1.8992 | 360 | 0.1304 |
| 361 | 1.8958 | 361 | 0.1274 |
| 362 | 1.8625 | 362 | 0.1218 |
| 363 | 1.8728 | 363 | 0.1206 |
| 364 | 1.8675 | 364 | 0.1247 |
| 365 | 1.8481 | 365 | 0.1195 |
| 366 | 1.8329 | 366 | 0.1193 |
| 367 | 1.7996 | 367 | 0.1198 |
| 368 | 1.8203 | 368 | 0.1144 |
| 369 | 1.7960 | 369 | 0.1156 |
| 370 | 1.7782 | 370 | 0.1152 |
| 371 | 1.7533 | 371 | 0.1164 |
| 372 | 1.7361 | 372 | 0.1107 |
| 373 | 1.7070 | 373 | 0.1096 |
| 374 | 1.6831 | 374 | 0.1093 |
| 375 | 1.6565 | 375 | 0.1022 |
| 376 | 1.6549 | 376 | 0.1021 |
| 377 | 1.6329 | 377 | 0.1071 |
| 378 | 1.6316 | 378 | 0.1018 |
| 379 | 1.6049 | 379 | 0.1006 |
| 380 | 1.6103 | 380 | 0.1010 |
| 381 | 1.5887 | 381 | 0.0993 |
| 382 | 1.5721 | 382 | 0.0974 |
| 383 | 1.5695 | 383 | 0.0975 |
| 384 | 1.5596 | 384 | 0.0935 |
| 385 | 1.5491 | 385 | 0.0951 |
| 386 | 1.5544 | 386 | 0.0950 |
| 387 | 1.5404 | 387 | 0.0915 |
| 388 | 1.5472 | 388 | 0.0911 |
| 389 | 1.5441 | 389 | 0.0920 |
| 390 | 1.5513 | 390 | 0.0926 |
| 391 | 1.5398 | 391 | 0.0908 |
| 392 | 1.5512 | 392 | 0.0924 |
| 393 | 1.5475 | 393 | 0.0911 |
| 394 | 1.5583 | 394 | 0.0898 |
| 395 | 1.5554 | 395 | 0.0892 |
| 396 | 1.5490 | 396 | 0.0902 |
| 397 | 1.5520 | 397 | 0.0892 |
| 398 | 1.5610 | 398 | 0.0883 |
| 399 | 1.5532 | 399 | 0.0857 |
| 400 | 1.5542 | 400 | 0.0825 |

The maximum UV absorbance for the inventive latex was measured at between about 338 and 341 nm. Clearly, the coating of the subject fabric with the inventive latex provided a significant improvement in UV absorbance (and thus decrease in UV transmittance which in turn results in a high UPF).

EXAMPLE 4

Latices A and B from EXAMPLE 2 were then each coated on non-woven 0.19 dpf polyester fabric swatches previously coated with coagulated polyurethane, dried, and tested for colorlightfastness in accordance with The Engineering Society for Advancing Mobility Land Sea air and Space Textile Test method SAE J-1885, "(R) Accelerated Exposure of Automotive Interior Trim Components Using a Controlled Irradiance Water Cooled Xenon-Arc Apparatus.". Colorlightfastness is generally calculated by the following equation:

$$\Delta E^* = ((L^*_{initial} - L^*_{exposed})^2 + (a^*_{initial} - a^*_{exposed})^2 + (b^*_{initial} - b^*_{exposed})^2)^{1/2}$$

wherein $\Delta E^*$ represents the difference in color between the fabric upon initial latex coating and the fabric after the above-noted degree of ultra violet exposure. $L^*$, $a^*$, and $b^*$ are the color coordinates; wherein $L^*$ is a measure of the lightness and darkness of the colored fabric; $a^*$ is a measure of the redness or greenness of the colored fabric; and $b^*$ is a measure of the yellowness or blueness of the colored fabric. Latex B showed a lower degree of colorlightfastness ($\Delta E^*$ of 2.64) than Latex A ($\Delta E^* = 3.63$). Thus, Latex B exhibited excellent colorlightfastness characteristics while Latex A demonstrated a lower degree of colorlightfastness. However, Latex A still showed very beneficial overall characteristics, particularly in comparison with the control, uncoated fabric ($\Delta E^* = 6.20$).

EXAMPLE 5

A series of polymers were made following the procedure described in EXAMPLE 1, but the weight ratio of Norbloc™ 7966/butyl methacrylate was varied by adjusting the addition rate of each monomer during a batch emulsion polymerization procedure. The surface tension of each polymer was adjusted as described in EXAMPLE 2. The resulting latices were dip/squeeze applied at 4% solids addition level to a nonwoven polyester (of the type fabric used in EXAMPLE 4) and dried. The coated fabrics were tested for colorlightfastness after 225 kJ/m$^2$ exposure (SAE J-1885). The latices with 40:60 and 35:65 monomer ratios showed the best colorfastness performance, in consideration of the cost of the UV monomer, as noted in the table below.

TABLE 2

| Ratio of UV comonomer to vinyl-functional monomer (in parts by weight) | % of Latex Solids (owf) | ΔE* at 225 kJ/m$^2$ |
|---|---|---|
| 85:15 | 1.7 | 3.30 |
| 85:15 | 3.4 | 2.30 |
| 70:30 | 1.7 | 2.90 |
| 70:30 | 3.4 | 2.10 |
| 55:45 | 1.9 | 2.00 |
| 55:45 | 3.7 | 1.80 |
| 50:50 | 1.7 | 2.37 |
| 50:50 | 3.3 | 1.50 |
| 40:60 | 1.8 | 2.36 |
| 40:60 | 3.5 | 1.13 |
| 35:65 | 1.8 | 2.83 |
| 35:65 | 3.0 | 1.57 |
| 30:70 | 1.7 | 3.00 |
| 30:70 | 3.5 | 1.60 |
| 25:75 | 1.7 | 3.36 |
| 25:75 | 3.9 | 2.37 |
| 20:80 | 1.9 | 2.80 |
| 20:80 | 3.4 | 3.06 |
| 10:90 | 1.8 | 3.13 |
| 10:90 | 3.8 | 2.62 |
| (Comparative) 100:0 | 1.8 | 4.50 |
| (Comparative) 100:0 | 3.4 | 3.80 |

EXAMPLE 6

The nowoven polyester of EXAMPLE 4 was coated with a UV absorbing polymer latex described in EXAMPLE 4 with a dip/squeeze application method and dried. Half of the sample was then processed further with a supersonic air treatment (SSAT) pursuant to U.S. Pat. No. 4,837,902, to Dischler, previously entirely incorporated by reference at ~25 ypm. Three runs were made for these fabrics and the colorlightfastnesses are listed in the following TABLE 2:

TABLE 3

| | | ΔE* (225 kJ/m$^2$) | |
|---|---|---|---|
| Run # | Polymer Latex Amount (owf) | without SSAT | with SSAT |
| 1 | 2.9 | 3.88 | 2.83 |
|   | 5.0 | 3.54 | 1.95 |
| 2 | 3.1 | 4.96 | 2.79 |
|   | 5.6 | 3.59 | 2.52 |
| 3 | 2.8 | 4.63 | 2.70 |
|   | 4.9 | 4.50 | 1.93 |

Clearly, the greater the amount of latex on the fabric surface, the better the colorlightfastness. Furthermore, it is evident that the treatment by SSAT provides improved colorlightfastness as well.

EXAMPLE 7

A batch polymerization was used to investigate the effects of the chain transfer agent, 1-dodecanethiol, on the performance of the UV-absorbing polymer latices. The reactor was a three-neck flask with a temperature probe, nitrogen inlet, and condenser/nitrogen outlet. The following materials were charged to the flask and stirred on a hot-plate stirrer: 10 g. Norbloc™ 7966 (Janssen), 10 g. butyl methacrylate (Aldrich), 8 g. Abex™ EP-120 (Rhône Poulenc), 2 g. Triton™ X-705 (Union Carbide), 2 g. Synfac® 8216 (Milliken Chemical), 68 g. distilled water, and 1-dodecanethiol (Aldrich). The temperature was raised to 75° C. until the solids were dispersed uniformly and then lowered to 65° C. for polymerization. The reactor was purged nitrogen for 30 minutes. To initiate the polymerization, 1 ml. of a 0.05 g VA-086 (Wako) and 0.05 g/3 ml. water of V-50 (Wako) was introduced into the flask. An opalescent-white emulsion resulted after 4 hours of reaction. The resultant latex was again tested from colorlightfastness at 225 kJ/m$^2$, in accordance with SAE J-1885 Test Method. A preferred range of concentration of 1-dodecanethiol was from about 0.008 to about 0.018% g./g. monomer was determined, with an optimum amount predicted as being about 0.0175% g./g. monomer.

TABLE 4

| % Solids (owf) | ΔE* at 225 kJ/m$^2$ | % g. 1-dodecanethiol/g. monomer |
|---|---|---|
| 2.4 | 3.27 | 0.002 |
| 4.7 | 2.59 | 0.002 |
| 2.6 | 2.88 | 0.005 |
| 5.2 | 2.36 | 0.005 |
| 2.2 | 2.70 | 0.008 |
| 4.6 | 2.46 | 0.008 |
| 2.4 | 2.63 | 0.012 |
| 4.9 | 2.00 | 0.012 |
| 2.2 | 3.81 | 0.018 |
| 4.6 | 2.86 | 0.018 |
| 2.3 | 3.44 | 0.025 |
| 5.0 | 2.56 | 0.025 |
| 2.6 | 3.61 | 0.030 |
| 4.8 | 3.18 | 0.030 |
| 2.2 | 5.18 | 0.050 |
| 4.8 | 4.26 | 0.050 |
| (Comparatives) | | |
| 1.8 | 5.12 | 0 |
| 3.8 | 3.61 | 0 |

EXAMPLE 8

Selected polyester fabrics were coated with UV-absorbing polymer latices (50/50 wt. ratio Norbloc™ 7966/butyl methacrylate) described in EXAMPLE 1 and exposed to SAE J-1885 colorlightfastness testing. The results show the improved lightfastness of the coated fabrics and are tabulated below:

TABLE 5

| Fabric Type | Amount of Latex (% owf; manner of application) | ΔE at X kJ/m$^2$ | | | |
|---|---|---|---|---|---|
| | | 225 | 451 | 676 | 901 |
| A | 0% (control) | 2.25 | 4.27 | * | * |
| A | 0.6%; spray coated | 1.93 | 3.42 | * | * |
| A | 1.3%; spray coated | 1.45 | 2.86 | * | * |
| B | 0% (control) | 1.73 | 3.29 | * | * |
| B | 0.91%; spray coated | 1.23 | 2.56 | * | * |
| C | 0% (control) | 3.82 | * | * | * |
| C | 0.62%; spray coated | 2.99 | * | * | * |
| C | 0.83%; spray coated | 2.86 | * | * | * |
| D | 0% (control) | 2.04 | 3.28 | * | * |
| D | 0.71%; spray coated | 1.22 | 2.29 | * | * |

TABLE 5-continued

| Fabric Type | Amount of Latex (% owf; manner of application) | ΔE at X kJ/m² | | | |
|---|---|---|---|---|---|
| | | 225 | 451 | 676 | 901 |
| E | 0% (control) | 6.87 | * | * | * |
| E | 1.45%; spray coated | 4.17 | * | * | * |
| F | 0% (control) | 0.56 | 1.20 | 2.13 | 3.61 |
| F | 5.1%; dip/squeeze applied | 0.51 | 0.74 | 1.26 | 2.37 |
| G | 0% (control) | 1.19 | 2.82 | 4.97 | 7.27 |
| G | 5.6%; dip/squeeze applied | 1.27 | 1.70 | 2.02 | 3.20 |
| H | 0% (control) | 3.89 | 6.23 | * | * |
| H | 0.66%; spray coated | 2.06 | 3.76 | * | * |
| I | 0% (control) | 2.83 | 6.57 | * | * |
| I | 0.70%; spray coated | 1.01 | 2.71 | * | * |
| J | 0% (control) | 3.42 | 6.01 | * | * |
| J | 0.50%; spray coated | 1.71 | 3.28 | * | * |
| K | 0% (control) | 6.20 | * | * | * |
| K | 1.5%; dip/squeeze applied | 2.55 | * | * | * |
| K | 3.3%; dip/squeeze applied | 1.18 | * | * | * |

* The high kJ/m² measurements were taken only for knit fabrics.

The above-listed fabrics were as follows:
A—Woven fabric including 50 denier nylon yarns and weighing 1.360 pounds per yard (greige)
B—Woven fabric including 600 denier nylon fibers and weighing 0.841 pounds per yard (greige)
C—Woven fabric including 500 denier polyester yarns and weighing 1.475 pounds per yard (greige)
D—Woven fabric including 450 denier nylon fibers and weighing 1 pound per yard (greige)
E—Woven fabric including 450 denier polyester ring-spun yarn weighing 1.380 pounds per yard (greige)
F—Knit fabric having 18 warps per inch and weighing 3.70 ounces per square yard
G—Knit fabric having 20 warps per inch and weighing 5.20 ounces per square yard
H—Woven fabric having 1684 warp ends and weighing 1.3285 pounds per yard (greige)
I—Woven fabric including nylon fibers having a greige fabric weight of 1.102 pounds per yard
J—Woven fabric including 150 denier nylon and weighing 0.7288 pounds per yard (greige)
K—The fabric utilized in EXAMPLE 4, above These results clearly indicate the improvement in lightfastness accorded the sample fabrics upon coating with the inventive polymer latex.

EXAMPLE 9

The polymer latex of EXAMPLE 1 was also applied by dip/squeeze technique to a greige 100% cotton sample comprised of warp ring-spun yarn and open end spun fill yarn, dyed khaki. This sample was tested for UV-A and UV-B transmittance. The results were as follows:

TABLE 6

| Amount of latex (% owf) | Transmittance | |
|---|---|---|
| | UV-A | UV-B |
| 0% (control) | 3.6% | 1.6% |
| 1.7% | 1.1% | 0.4% |
| 4.0% | 0.8% | 0.3% |

Clearly, the presence of the inventive latex provided a significant improvement in UV transmittance (and thus a better UPF for cotton which generally possesses unsatisfactory Ultraviolet Protection Factors).

EXAMPLE 10 (Comparative)

A UV-absorbing polymer emulsion with a 25 wt. % Norbloc™ 7966/75 wt. % butyl methacrylate ratio was prepared as described in EXAMPLE 4. The latex was sprayed on the same type of fabric as utilized in EXAMPLE 4, above, and dried. Secondly, a conventional UV absorber, Cibafast® P (Ciba) was also sprayed on the same type of fabric and dried. The samples were tested according to Test Method SAE J-1885 after 225 and 451 KJ/m² exposure. The inventive UV-absorbing polymer latex provided overall better colorlightfastness as noted in the table below:

TABLE 7

| Sample | ΔE* at X kJ/m² | |
|---|---|---|
| | 225 | 451 |
| 0% Latex (control) | 4.5 | 7.8 |
| 2% (owf) of the inventive latex (spray coated) | 3.1 | 5.4 |
| 2% (owf) of Cibafast ® P (spray coated) | 4.0 | 6.7 |

There are, of course, many alternative embodiments and modifications of the present invention which are intended to be included within the spirit and scope of the following claims.

What we claim is:
1. A method of making an ultraviolet absorbing copolymer latex by emulsion polymerization comprising
    mixing together, in the presence of at least one polymerization initiator and at least one chain transfer agent,
    (a) at least one vinyl-functional monomer having at least one ultra violet absorbing functionality selected from the group consisting of benzotriazole, benzophenone, and mixtures thereof; and
    (b) at least one vinyl-functional monomer not comprising a benzotriazole or benzophenone group;
    wherein said chain transfer agent is present in an amount of from about 0.002 to 0.050% by weight of the total aggregate amount of the UV-absorbing monomer and the vinyl-fiunctional monomer.
2. The method of claim 1 wherein
    said UV-absorbing comonomer is selected from the group consisting of 2-hydroxy-5-acrylyloxyphenyl-2H-benzotriazole, 1-(3-benzotriazol-2-yl-4-hydroxyphenyl)-ethyl ester acrylic acid, 2-(2-methacryloxy-5'-methylphenyl) benzotriazole, 2-hydroxy-4-acrylyloxyethoxy benzophenone, and any mixtures thereof;
    said vinyl-functional monomer is selected from the group consisting of acrylates and methacrylates, and any mixtures thereof.
3. The method of claim 2 wherein
    the UV-absorbing comonomer is 2-Hydroxy-5-acrylyloxyphenyl-2H-benzotriazole;
    said vinyl-functional monomer is selected from the group consisting of butyl acrylate, methyl methacrylate, butyl methacrylate, ethyl-hexyl methacrylate, lauryl methacrylate, isodecyl methacrylate, n-hexyl methacrylate, and any mixtures thereof;
    said UV-absorbing monomer and said vinyl-functional comonomer are present in weight ratio amounts of from about 25:75 to about 60:40.
4. The method of claim 3 wherein
    said vinyl functional comonomer is butyl methacrylate;

said UV-absorbing monomer and said vinyl functional comonomer are present in weight ratio amounts of from about 25:75 to about 50:50; and said chain transfer agent is present in an amount from about 0.008 to about 0.018% by weight of the total aggregate amount of the UV-absorbing monomer and the vinyl functional comonomer.

5. The method of claim 3 wherein said UV-absorbing monomer and said vinyl functional comonomer are present in a weight ratio amount of about 35:65; and said chain transfer agent is 1-dodecanethiol and is present in an amount of about 0.0175% by weight of the total aggregate amount of the UV-absorbing monomer and the vinyl functional comonomer.

6. An article comprising the polymer latex produced by the method of claim 1.

7. An article comprising the polymer latex produced by the method of claim 2.

8. An article comprising the polymer latex produced by the method of claim 3.

9. An article comprising the polymer latex produced by the method of claim 4.

10. An article comprising the polymer latex produced by the method of claim 5.

11. A fabric article comprising the polymer latex produced by the method of claim 1, wherein said fabric comprises fibers selected from the group consisting of cotton, polyester, nylon, wool, ramie, lycra, and any mixtures or blends thereof.

12. A fabric article comprising the polymer latex produced by the method of claim 2, wherein said fabric comprises fibers selected from the group consisting of cotton, polyester, nylon, wool, ramie, lycra, and any mixtures or blends thereof.

13. A fabric article comprising the polymer latex produced by the method of claim 3, wherein said fabric comprises fibers selected from the group consisting of cotton, polyester, nylon, wool, ramie, lycra, and any mixtures or blends thereof.

14. A fabric article comprising the polymer latex produced by the method of claim 4, wherein said fabric comprises fibers selected from the group consisting of cotton, polyester, nylon, wool, ramie, lycra, and any mixtures or blends thereof.

15. A fabric article comprising the polymer latex produced by the method of claim 5, wherein said fabric comprises fibers selected from the group consisting of cotton, polyester, nylon, wool, ramie, lycra, and any mixtures or blends thereof.

16. An article according to claim 11 wherein said fabric is subjected to supersonic air treatment subsequent to the introduction of the polymer latex onto the fabric surface.

17. An article according to claim 12 wherein said fabric is subjected to supersonic air treatment subsequent to the introduction of the polymer latex onto the fabric surface.

18. An article according to claim 13 wherein said fabric is subjected to supersonic air treatment subsequent to the introduction of the polymer latex onto the fabric surface.

19. An article according to claim 14 wherein said fabric is subjected to supersonic air treatment subsequent to the introduction of the polymer latex onto the fabric surface.

20. An article according to claim 16 wherein said fabric is subjected to supersonic air treatment subsequent to the introduction of the polymer latex onto the fabric surface.

* * * * *